United States Patent [19]

Wilson et al.

[11] Patent Number: 5,032,627
[45] Date of Patent: Jul. 16, 1991

[54] METHOD FOR REDUCING HOLLOW GLASS SPHERE FRACTURE IN THERMOPLASTIC RESIN BY MELT OR BULK POLYMERIZATION/EXTRUSION

[75] Inventors: Gary F. Wilson, Grafton; Yona Eckstein, Kent, both of Ohio

[73] Assignee: The BFGoodrich Company, Akron, Ohio

[21] Appl. No.: 332,266

[22] Filed: Mar. 31, 1989

[51] Int. Cl.$^5$ .................. C08K 7/28; C08K 7/22
[52] U.S. Cl. .................. 523/218; 523/219; 524/847; 524/871; 524/875; 264/DIG. 6
[58] Field of Search ............. 523/218, 219; 524/847, 524/871, 875, 590; 264/DIG. 6, DIG. 7

[56] References Cited

U.S. PATENT DOCUMENTS

| | | | |
|---|---|---|---|
| 3,316,139 | 4/1967 | Alford et al. | |
| 3,866,652 | 2/1975 | Ahmad | 152/317 |
| 4,001,368 | 1/1977 | Michizoe et al. | 264/236 |
| 4,038,238 | 7/1977 | Cravens | 523/219 |
| 4,077,922 | 3/1978 | Farrissey et al. | 523/219 |
| 4,111,349 | 9/1978 | Buckler et al. | 229/3.5 |
| 4,241,190 | 12/1980 | Lichter et al. | 521/54 |
| 4,391,646 | 7/1983 | Howell | 106/97 |
| 4,416,926 | 11/1983 | Maglio | 428/31 |
| 4,556,603 | 12/1985 | Thorsrud | 428/283 |
| 4,788,230 | 11/1988 | Mudge | 523/219 |

FOREIGN PATENT DOCUMENTS 0727696  2/1966  Canada .................. 523/219

Primary Examiner—Lewis T. Jacobs
Attorney, Agent, or Firm—Debra L. Pawl; Daniel J. Hudak

[57] ABSTRACT

An in situ polymerized thermplastic resin incorporating hollow glass spheres, which are incorporated during polymerization of the resin, and a method of making a concentrate of hollow glass spheres dispersed in a thermoplastic resin with minimal sphere fracture by adding the spheres during polymerization of the resin.

17 Claims, No Drawings

METHOD FOR REDUCING HOLLOW GLASS SPHERE FRACTURE IN THERMOPLASTIC RESIN BY MELT OR BULK POLYMERIZATION/EXTRUSION

FIELD OF INVENTION

The present invention generally relates to thermoplastic resin with hollow glass spheres. In one aspect, the invention specifically relates to a concentrate of hollow glass spheres dispersed in an in situ polymerized thermoplastic resin, for use as a masterbatch additive. In another aspect, the invention relates to a method for compounding hollow glass spheres into a thermoplastic resin, under high shear forces, by adding the spheres during the in situ polymerization of the resin, to greatly reduce or eliminate the fracturing of the spheres.

BACKGROUND AND SUMMARY OF THE INVENTION

Incorporating fragile additives, such as hollow glass spheres, into unfilled thermoplastic resins without substantial breakage of the spheres presents processing problems not heretofore encountered with traditionally used thermoset resins.

Before curing, thermoset resins have a relatively lower viscosity than thermoplastic resin and thereby provide a more readily workable medium. Generally speaking, the more viscous thermoplastic resins require more work and higher shear forces in order to process before cure. Hollow sphere fracture is undesirable because it raises the specific gravity of the composite and defeats the purpose for adding the spheres. Even further fracturing of the spheres is known to occur during subsequent compression and, in particular, injection molding processes, used to form articles, such as car bumpers. In order to take full advantage of the specific gravity reduction seen in the presence of hollow spheres, the integrity of the spheres must be maintained during compounding and subsequent processing or molding.

It has now been discovered that significant reduction in hollow sphere fracture can be realized by adding the spheres to the thermoplastic resin during the in situ polymerization of the resin. Additionally, a greater volume of spheres than heretofore known can be loaded into the resin by this method.

An in situ polymerized thermoplastic resin incorporating hollow glass spheres by this method, has utility as a masterbatch additive for compounding into other resins, particularly resins filled with fiberglass reinforcement. During the last decade, the automotive and aircraft industries have concentrated their efforts on reducing the overall weight of the vehicles and aircraft. Initially, weight reduction was achieved by replacing metal parts with suitable plastic parts made from thermoset resins. However, in structural applications, the plastic parts are very often lacking in mechanical performance. Thus, to improve their performance, various reinforcing fibrous materials, such as glass fibers, carbon fibers and aramid fibers, are added to the plastic resin. As a cost savings measure, low cost inorganic fillers, such as talc, calcium carbonate or clay, are additionally added to the resin.

However, the addition of the fibers and inorganic fillers undesirably increases the composite's specific gravity and weight per molded part. Accordingly, an increase in price per unit volume may follow. To counteract this weight increase, it is known that hollow glass spheres may be added, but their density lowering effect has not heretofore been fully realized. Substantial sphere fracture occurs during conventional melt compounding with fiber reinforced resins. To solve this problem the inventors add the spheres in the form of a concentrate of spheres dispersed in resin, or a masterbatch, (which is the subject of a copending application).

By using the inventive masterbatch, a significant reduction or elimination of hollow glass sphere fracture during compounding with a resin containing fibrous reinforcements, especially large amounts, will be realized. It is believed that the masterbatch resin covering the glass spheres protects them from breakage by lessening the effects of the shear forces exerted by the mechanical action of the compounding apparatus and the abrasive contact with the glass fibers. Consequently, the use of this inventive masterbatch permits the density-lowering effect of the spheres to be more fully realized in that the lowered density of reinforced resins incorporating the spheres can be better maintained throughout processing and reprocessing.

DESCRIPTION OF THE PREFERRED EMBODIMENT(S)

The inventive thermoplastic resin composition is made by adding the spheres to the resin during the melt or bulk polymerization of the resin. The resulting resin composition not only has fewer fractured spheres, but even after subsequent processing of the compound, the sphere integrity is retained.

The in situ polymerization process is a reaction extruder process. The polymer reactants are added to the reactor portion of the apparatus where polymerization begins. The reacting mixture is then passed into the extruder portion of the apparatus during which time the polymerization reaction is completed before the polymer resin exits through the extruder die. As in any conventional extruder process, the resin is subjected to high shear mixing forces as it passes down the extruder. The hollow glass spheres may be added at any time during the polymerization, but preferably they are added after about 50% to about 90% of the material is polymerized.

For example, to make an in situ polymerized thermoplastic polyurethane masterbatch containing hollow glass spheres, the two resin components, that is, a blend of polyol and diol and MDI, are heated to about 100° C., separately. The blend and the MDI are then mixed together in the reactor and a standard high temperature random melt polymerization reaction begins. Due to the exothermic nature of the reaction, the temperature increases to about 200° C. to 280° C. in about 1 to 5 minutes. An increase in the material's viscosity is evidence that polymerization is occurring. The material, which is approximately 90% reacted, is passed into the extruder, where it is mixed under high shear forces and polymerization is completed before the polymer resin exits through the extruder die. The hollow glass spheres are added to the polymerizing resin just before it enters into the extruder.

Conventional techniques and conditions may be used to in situ polymerize the other suitable resins. Any conventional reactor extruder apparatus can be used. Suitable extruder designs are those having a single screw, twin screw or a modified screw configuration. Commercially available apparatus include Welding Engineers 3.5" unit with a counter-rotating, non-intermeshing, twin screw design, from Welding Engineers, Inc., Blue Bell, Pa., U.S.A. Single screw extruders are available from Bersdorff in Charlotte, N.C., U.S.A. Suitable results were also achieved with a Buss Kneader from Buss America, Elk Grove, Ill., U.S.A. One skilled in the art will appreciate that without undue experimentation, the screw configuration can be selected and/or adjusted, within limits, so as to minimize fracture of the fragile additives.

Any thermoplastic resin is suitable, including polyurethanes, polyesters, polycarbonates, polyamides and polystyrenes, polymethylmethacrylate and polyvinyl chloride.

Thermoplastic polyurethane (TPU) is the preferred resin. Most desirable are those TPUs formulated for use in extrusion, injection molding and compression molding processes. Suitable polyurethanes are prepared by reacting a polyisocyanate with a blend of a hydroxyl terminated polyester, polyether or mixtures thereof and one or more chain extenders.

The hydroxyl terminated polyester is generally a linear polyester having a molecular weight of about 500 to about 10,000 and preferably from about 700 to about 5000 and acid number generally less than 1.3 and preferably less than 0.8. The molecular weight is determined by assay of the terminal functional groups and is an average molecular weight. The polyesters are produced by (1) an esterification reaction of one or more glycols with one or more dicarboxylic acids or anhydrides or (2) by transesterification reaction i.e. the reaction of one or more glycols with esters of dicarboxylic acids. Mole ratios generally in excess of more than one mole of glycol to acid are preferred so as to obtain linear chains having a preponderance of terminal hydroxyl groups.

The dicarboxylic acids can be aliphatic, cycloaliphatic or aromatic. Suitable dicarboxylic acids which may be used alone or in mixtures include: succinic, glutaric, adipic, pimelic, suberic, azelaic, sebacic, dodecanedioic, isophthalic, terephthalic cyclohexane dicarboxylic and the like. Anhydrides of the above dicarboxylic acids such as phthalic anhydride, tetrahydrophthalic anhydride or the like can also be used. Adipic acid is the preferred acid.

The glycols can be aliphatic or aromatic. Suitable glycols include: ethylene glycol, propylene-1,2-glycol, 1,3-propanediol, butylene-1,3-glycol, 1,4-butanediol, 1,6-pentanediol, 1,6-hexanediol, 2,2-dimethylpropane-1,3-diol, 2,2-diethylene-1,3-diol, 1,4-cyclohexanedimethanol, decamethylene glycol, dodecamethylene glycol, and the like. 1,4-butanediol is the preferred glycol. Suitable polyesters include polycaprolactone typically made from -caprolactone and a bifunctional initiator such as diethylene glycol, while the polycarbonates are typically made from diols, such as hexanediol-1,6, and phosgine or by transesterification with low molecular weight carbonates like diethyl or diphenyl carbonate. Suitable polycarbonates and methods of preparation are disclosed in U.S. Pat. No. 4,643,949, which is incorporated herein by reference.

Polyether glycols that can be used are polytetramethylene ether glycol (PTMEG), polyethylene glycol, polypropylene glycol, ethylene oxide capped polypropylene glycol, polytetramethylene/ethylene oxide ether glycol and the like. Such polyether glycols can have a molecular weight of about 500 to 4000 and preferably from about 800 to about 2000. A preferred polyether glycol is polytetramethylene ether glycol.

Although any conventional polyisocyanate can be used, the preferred one is a diisocyanate which can be aliphatic or aromatic. Suitable diisocyanates include: decane-1,10-diisocyanate, phenylene-1,4-diisocyanate, naphthylene-1,5-diisocyanate, diphenylmethane-4,4'-diisocyanate (MDI), diphenylmethane-3,3'-dimethoxy-4,4'-diisocyanate, dicyclohexylmethane-4,4'-diisocyanate, and cyclohexyl-1,4-diisocyanate.

Typically the polyols are blended with a chain extender before reaction with a polyisocyanate. The chain extender may be any diol, or combination of diols, containing 2 to 10 carbon atoms, such as ethylene glycol, propylene glycol, 1,4-butanediol, 1,3-butanediol, 1,5-pentanediol, 1,6-hexanediol, 1,4-cyclohexane-dimethanol, hydroquinone di(hydroxyethyl)ether, or any aliphatic or aromatic molecule containing two reactive hydroxyl groups. The preferred chain extender is 1,4-butanediol.

The hydroxyl terminated polyols described above can be blended with a chain extender before the blend is reacted with a diisocyanate or the polyol and chain extender can be brought to the reaction zone simultaneously. Stabilizers such as antioxidants can be added prior to the reaction or during the reaction.

The amount of the chain extender is generally from about 0.04 to about 35 moles and desirably from about 0.07 to about 20 and more preferably from about 3 to about 15 for every mole of the hydroxyl terminated polyol. Generally, the number of moles of diisocyanate per total number of moles of the hydroxyl terminated polyol and the chain extender is from about 0.95 to about 1.12, and preferably from about 0.98 to about 1.06.

It was found that a higher molecular weight polymer also aided in diminishing the fracture of the glass spheres. When the ratio of isocyanate (NCO) to hydroxyl (OH) is about 1:1, then a polymer having a molecular weight of at least about 200,000 is desirable.

The hollow spheres are desirably unicellular glass microspheres composed of a water resistant and chemically stable glass, such as a soda-lime-borosilicate glass. Typically, such a glass is non-porous, non-combustible and has a low alkalinity thus making the spheres compatible with most resins, not a fire hazard and non-absorbent with respect to the matrix resin. The spherical shape of the bubbles provides minimum surface area to volume ratio. The spheres typically appear uniformly white in color to the unaided eye.

Typically, the average size of the spheres range from 8 microns to 180 microns. Generally, the average true particle density, in grams per cubic centimeter (g/cc), of the spheres ranges from about 0.12 to about 1.10. The strength of the sphere largely depends upon the thickness of the wall. The best results were obtained with the higher strength spheres. Desirably, the spheres will have an average hydraulic crush strength of between 5,000 to 10,000 psi.

A variety of hollow glass microspheres are commercially available. For example, spheres known as Scotchlite TM are available from the Minnesota Mining and Manufacturing Company (3M), St. Paul, Minn., U.S.A. The preferred spheres are the Scotchlite TM B46/4000 Glass Bubbles, which average 149 microns in diameter and have an average particle density of 0.46 g/cc and S60/10,000 Glass Bubbles which average 149 microns in diameter and have an average particle density of 0.60 g/cc. The stronger and most preferred is the S60/10,000 Glass Bubbles.

Any amount of spheres may be incorporated into the resin. When used as a masterbatch additive, it is expected that a relatively high percentage of spheres will be loaded into the resin to make it useful as a concentrate. Therefore, the resin may contain, by volume, from about 20% to about 65% spheres, preferably from about 35% to about 55%, and most preferably about 50%.

As a practical matter, the maximum amount of spheres which can be incorporated into the masterbatch resin depends on the density of the spheres. Generally, if one adds to a resin the same weight percent of spheres having different densities, then the lower density spheres will occupy a larger volume of the resin than the higher density spheres. For example:

| spheres (density g/cc) | weight (%) | volume occupied (%) |
|---|---|---|
| 0.46 | 40 | 64 |
| 0.60 | 40 | 58 |

When using the S60/10000 spheres, it is expected that the maximum volume of the resin they can occupy is 65%.

Also, if the masterbatch polymer is lacking in physical properties, then it may be desirable to minimize the effect of the polymer by increasing the volume of the spheres and thereby decreasing the amount of polymer later to be added to the reinforced resin. Desirably, the masterbatch will contain, by volume, from about 20% to about 65% spheres, preferably from about 35% to about 55%, and most preferably about 50% spheres.

It is not necessary, but if desired the spheres may be treated with conventional glass fiber sizes.

SPECIFIC EMBODIMENTS

In the following examples 1-11, the masterbatch resin and unfilled compounding resin were thermoplastic polyurethanes, comprised of MDI, a polyol having a molecular weight between 3000 and 4000, adipic acid and 1,4-butane diol. All specific gravity measurements were made on injection molded plaques, unless indicated otherwise. The hollow glass spheres were 3M, Scotchlite ™ B46/4000 and S60/10000. The glass fibers were 497X12 ¼" chopped fibers from Ownes-Corning Fiberglas Corporation, Toledo, Ohio, U.S.A. The results are summarized in Table I.

Examples 1 and 2

Hollow spheres (B46/4000 and S60/10000) were compounded with a thermoplastic polyurethane resin using conventional melt compounding techniques. The results demonstrate a relatively higher degree of sphere fracture when the spheres are added to an already polymerized melting polymer.

Examples 3 and 4

This example demonstrates the significantly reduced sphere fracture, for stronger spheres, when the spheres are incorporated into the resin during the course of polymerization.

Examples 5-11

Examples 5-7 demonstrate the amount of sphere fracture using the compounds of Examples 1 and 2 as masterbatch of the hollow spheres, compounded into a thermoplastic resin containing glass fibers. The glass fibers were also compounded as a masterbatch with a thermoplastic polyurethane. Examples 8-11 demonstrate compounding the compound of Examples 3 and 4 as the masterbatch of hollow glass spheres into a thermoplastic polyurethane containing glass fibers. Little or no sphere fracture occurs using the stronger spheres and the inventive masterbatch.

TABLE I

| Ingredient | 1 | 2 | 3 | 4 | 5 | 6 | 7 | 8 | 9 | 10 | 11 |
|---|---|---|---|---|---|---|---|---|---|---|---|
| Glass Fiber Content (wt. %) | — | — | — | — | 10 | 10 | 10 | 19 | 23 | 16 | 30 |
| Glass sphere vol. % | 45 | — | 40 | — | 12.2 | — | — | — | — | — | — |
| B46/4000, wt. % | 23 | — | 20 | — | 4.7 | — | — | — | — | — | — |
| S60/10000, vol. % | — | 45 | — | 46 | — | 12.1 | 22.5 | — | — | — | — |
| wt. % | — | 30 | — | 30 | — | 6.1 | 11.8 | 2 | 2 | 10 | 10 |
| Sp. Gravity, Theoretical | 0.867 | 0.94 | 0.916 | 0.93 | 1.19 | 1.206 | 1.14 | 1.32 | 1.35 | 1.19 | 1.29 |
| Sp. Gravity, Measured | 1.095 | 1.004 | 1.36 | 0.94–0.95 | 1.26 | 1.238 | 1.20 | 1.32 | 1.35 | 1.18 | 1.32 |
| % Damaged Spheres | 47 | 17 | 35* 100 | 3-5* 3–5 | 63 | 30 | 37 | 0 | 0 | 0 | 18 |

*measured on pellets, using a combination of pyrolysis and selective sedimentation techniques. A known amount of ash from pyrolized pellets was dispersed in a graduated cylinder filled with water. Undamaged hollow spheres floated, while those that fractured precipitated at the bottom of the cylinder. The % damaged spheres was calculated from the weight of the precipitated material.

Although the invention has been described in terms of specific embodiments of a manner in which the invention may be practiced, this is by way of illustration only and the invention is not necessarily limited thereto since alternative embodiments and operating techniques will become apparent to those skilled in the art. Accordingly, modifications are contemplated which can be made without departing from the spirit of the described invention.

We claim:

1. A melt or bulk polymerized thermoplastic resin composition, having dispersed therein hollow glass spheres, said spheres being added to the resin during polymerization, and wherein said spheres are added after at least 50 percent of said resin has polymerized.

2. A concentrate of hollow glass spheres dispersed in a thermoplastic resin made by the process of polymerizing the resin and adding the spheres during polymerization of the resin, and wherein said spheres are added after at least 50 percent of said resin has polymerized.

3. The composition of claim 1 wherein the resin is a polyurethane.

4. The composition of claim 3 wherein the polyurethane is one containing from about 0.04 to about 35 moles chain extender for every mole of hydroxyl terminated polyol, and from about 0.95 to about 1.12 moles of diisocyanate per total number of moles of hydroxyl terminated polyol and chain extender.

5. The composition of claim 3 wherein the hollow glass spheres are one having a hydraulic crush strength of between about 5,000 and 10,000 psi and wherein said spheres are added after at least 90 percent of said resin has polymerized.

6. An improved method of making a concentrate of hollow glass spheres dispersed in a thermoplastic resin with minimal sphere fracture by polymerizing the resin and adding said spheres during the polymerization of said resin, and wherein said spheres are added after at least 50 percent of said resin has polymerized.

7. The method of claim 6 wherein the resin is a polyurethane.

8. The method of claim 7 wherein the polyurethane is one containing from about 0.04 to about 35 moles chain extender for every mole of hydroxyl terminated polyol, and from about 0.95 to about 1.12 moles of diisocyanate per total number of moles of hydroxyl terminated polyol and chain extender.

9. The method of claim 7 wherein the hollow glass spheres are ones having a hydraulic crush strength of between about 5,000 and 10,000 psi and including adding said spheres after at least 90 percent of said resin has polymerized.

10. An improved method of reducing the fracture of hollow glass spheres extruder compounded into a thermoplastic resin comprising: preceding the extruder compounding with the melt or bulk polymerization of the resin and adding the spheres to the resin during polymerization.

11. The composition of claim 1 wherein the polymerization temperature is above the melting point of said thermoplastic resin.

12. The composition of claim 3 wherein the polymerization temperature is above the melting point of said polyurethane resin.

13. The composition of claim 5 wherein the polymerization temperature is above the melting point of said polyurethane resin.

14. The method of claim 6 including polymerizing said resin above the melting point of said resin.

15. The method of claim 9 including polymerizing said resin above the melting point of said resin.

16. A thermoplastic masterbatch resin comprising the composition of claim 1.

17. A polyurethane masterbatch resin comprising the composition of claim 3.

* * * * *